C. STIRIZ.
DOUGH MIXING MACHINE.
APPLICATION FILED FEB. 26, 1910.
1,062,201.
Patented May 20, 1913.
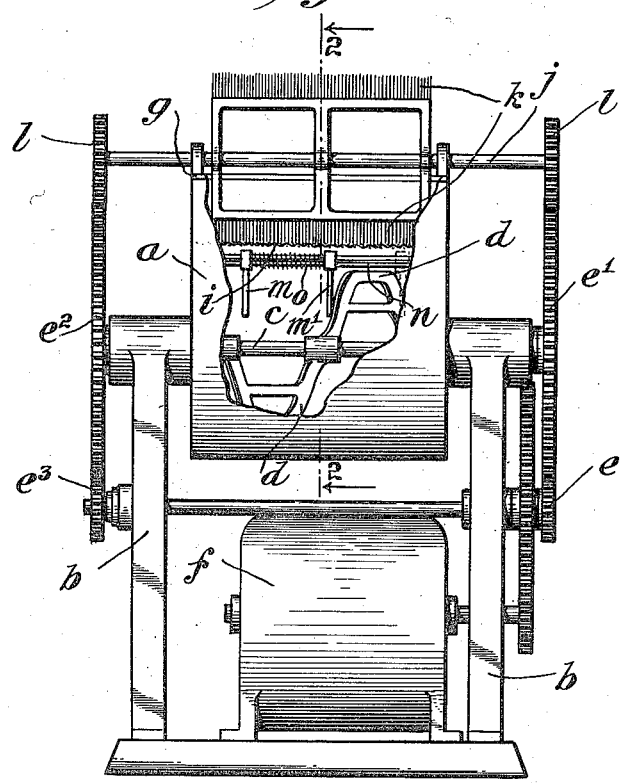
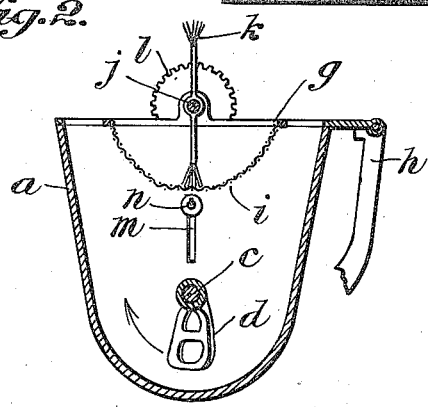
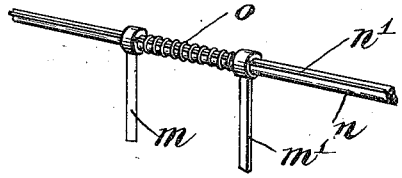
Attest:
Charles Stiriz   Inventor:
by Frank P. Wentworth
his Atty.

UNITED STATES PATENT OFFICE.

CHARLES STIRIZ, OF NEW YORK, N. Y., ASSIGNOR OF ONE-HALF TO ANNA A. STIRIZ, OF NEW YORK, N. Y.

DOUGH-MIXING MACHINE.

1,062,201.   Specification of Letters Patent.   Patented May 20, 1913.

Application filed February 26, 1910. Serial No. 546,058.

*To all whom it may concern:*

Be it known that I, CHARLES STIRIZ, a citizen of the United States, residing in the borough of Manhattan, in the city, county, and State of New York, have invented certain new and useful Improvements in Dough-Mixing Machines, of which the following is a specification, reference being had therein to the accompanying drawings, which form a part thereof.

My invention relates to dough mixers, and more particularly to a type of dough mixer adapted for use in bakeries wherein large quantities of dough are handled.

The main object of the invention is to provide a dough mixer embodying therein, in a single structure means for mixing and sifting the flour and for mixing the dough after the admixture of the flour with the other ingredients, which structure will be so constructed and arranged as to permit the convenient removal of the dough after it is mixed.

A further object is to provide a power driven dough mixer having removably attached to the top thereof a flour sifter or sieve whereby the flour may be sifted and mixed directly within the trough of the mixer thus avoiding the necessity for a separate flour mixer, sieve and elevator system now commonly used in connection with mixers of this character.

A still further object is to provide a combined dough mixer and sifter wherein the flour deposited in the sifter will be delivered directly into the dough trough where it is constantly agitated by the mixing blades, and wherein the agitators of the sieve will be driven simultaneously with said blades.

A still further object is to provide a dough mixer having a sifter hinged above the trough thereof whereby said sifter may be swung free of the top of the trough so as to permit the overturning or tilting of the trough, and the handling of the dough, without interference from said sifter.

A still further object is to provide in a dough mixer employing rotary blades, means for automatically clearing the edges of the blades to obviate the necessity of the operator placing his hands within the trough for this purpose.

A still further object is to provide in a dough mixer, a blade scraper having a lateral movement under the influence of the helicoidal blades to impart a lateral shearing movement thereto and at the same time automatically and properly position said scraper relative to the blade to be cleaned thereby. And a still further object is to provide a cleaning device for the mixing blades which in its operation will tend to aid in the disintegration of the mass of dough to insure a more thorough aeration thereof.

The invention consists in the novel features of construction and combination of parts hereinafter set forth and described and more particularly pointed out in the claims hereto appended.

Referring to the drawings:—Figure 1 is a front view of a dough mixer embodying my invention with the sieve in place, the front of the trough being broken away to disclose the interior arrangements of the mixer; Fig. 2 is a section through the trough on the line 2—2 of Fig. 1, and Fig. 3 is a detailed view of the mixer blades cleaning mechanism.

Like letters refer to like parts throughout the several views.

In the accompanying drawings, I have shown at $a$ a tilting trough mounted between suitable standards $b$. Passing through the trough $a$ is a shaft $c$ carrying helicoidal mixing blades $d$ of the usual and well known construction. Both of said blades $d$ are pitched laterally and toward the center of the trough $a$ and the shaft $c$. Said mixer blades are driven through the entrained gears $e$ by the motor $f$, the last gear $e'$, of the train $e$, being mounted upon one end of the shaft $c$ and a similar gear $e^2$ in mesh with the pinion $e^3$, being carried by the other end of said shaft. This construction is old and well known in this art, its purpose being to cause the blades $d$ to work and aerate the dough in the trough $a$, said trough being tilted downwardly to discharge the contents thereof upon the kneading board or other suitable receptacle.

As now commonly used, the trough $a$ is open at the top and the dough mixer is used in conjunction with a flour mixer and elevator driven from the same or by a separate motor, the flour being mixed in said auxiliary machine and conveyed and discharged into said trough. This arrangement results in a loss of floor space in addition to the additional cost of the equipment. To obviate this difficulty, I provide a flour sifter adapted to be positioned in the open top of the trough *a* thus not only permitting the flour to be sifted directly into the trough, but causing the mixer blades *d* to thoroughly mix this flour as it is so delivered. This sifter consists of a frame *g* mounted upon an extension *h* of the standard *b* which frame carries the screen *i* projecting within the trough *a*. This screen or sifter will ordinarily have a capacity of between one and two barrels, thus permitting the entire mass of flour to be sifted into the trough at one time.

Mounted in suitable bearings in the frame *g* is a rotary frame *j* carrying agitators *k* adapted to engage a considerable area at the bottom of the sieve *i* for the purpose of thoroughly sifting the flour. Preferably the agitator *k* embodies therein a plurality of bristles. The shaft *k'* of the agitator *k* has mounted upon the opposite ends thereof pinions *l* adapted to mesh with the gears *e' e²* respectively, thus causing said agitator to be driven from the same motive power as the mixing blades *d*, and simultaneously therewith. The frame *g* being hinged to the standards supporting the trough, and independently of the trough itself, when it is desired to mix or discharge the dough, it is is merely necessary to swing the entire frame *g* upwardly to allow a clear field for the handling of the trough itself either while mixing the dough or when it is desired to discharge same. This construction combines in one structure a complete flour sifting and dough mixing apparatus and one which will occupy but small floor space while permitting the dough mixer to be used in the usual and well known manner.

In using a dough mixer of this character, there is a tendency of the dough to adhere to the mixer blades *d* thus impairing the efficiency of these blades and at the same time interfering with the proper aeration of the mass of dough. To keep these blades clear in the ordinary machine, the operator has to frequently scrape same with a knife and as this is done while the mixer blades are rotating, the operation is not only inconvenient, but frequently results in injury to the operator. To obviate this difficulty, I provide means actuated automatically by the mixer blades themselves whereby, with each rotation thereof, the dough is scraped from the greater portion of the operative area thereof keeping said blades clear and at the same time disintegrating or breaking up the mass of dough in a manner to more thoroughly aerate same. This means consists of a plurality of sliding scrapers *m m'* mounted upon a shaft *n* having a feather *n'*, said scrapers being capable of lateral movement upon said shaft when propelled by the cammed surface presented thereto by the helicoidal blades *d*. The scrapers *m m'* are spaced apart sufficiently to bring one of them at least, into operative engagement with one of the blades *d*; the lateral movement of said scrapers resulting in the automatic positioning of one of them in the path of its mixer blade, the lateral traverse along the edge of said blade resulting in the removal of any dough adhering thereto. To compensate for the impact of the first engagement of each scraper with its blade, I employ two independent scrapers, that is, scrapers not connected with each other in any way, and mounted between them a suitable spring *o* which will absorb the jars of such impact and also force the other scraper before the scraper which is in operative engagement with the blade. By this construction I provide a scraper having lateral reciprocatory movement under the influence of the helicoidal mixer blades whereby each mixer blade, with each rotation thereof, has the dough scraped therefrom.

The operation of the herein described dough mixer is substantially as follows:—When it is desired to charge the trough *a* with flour, the barrel or other receptacle containing the flour is raised by hand or in any other desired manner and its contents dumped into the sifter or sieve *i* which has been lowered so as to bring its gears *l* into mesh with the gears *e' e²*. The desired proportion of the contents of said receptacle having been delivered to said sieve, or screen, the motor *f* is started, thus rotating the agitators *k* and the mixer blades *d*. The flour is thus sifted directly into the trough *a* and as it is delivered thereto, it is thoroughly mixed by the mixer blades *d*, the agitator *k* acting in the usual and well known manner. When the flour is thoroughly mixed in the trough *a*, the frame *g* is raised, leaving the trough open at the top so as to permit the admission of the other ingredients for the dough, or the tilting of the trough *a* to discharge the mixed flour if such be desired. The flour having been mixed and placed into the trough *a*, the mixer blades *d* are rotated in the usual manner, thus working the dough and cutting it up in a manner to cause it to be thoroughly mixed and aerated. As the said blades are rotated, the advance edge thereof (the outer edge) or a portion adjacent thereto engages the scraper *m* and forces it toward the center of the trough, through the continuous rotation of said blade, said scraper in its lateral traverse freeing the entire edge of the mixing blade from any dough adhering thereto. As it reaches the last edge of the mixer blade, the scraper passes from the influence of this blade and ceases its lateral traverse. While moving as described, said scraper imparts a similar movement to the other scraper *m'* through the spring *o*, both said scrapers moving upon the shaft *n*, and being held against oscillation thereon by the feather n'. As the scraper m passes from the influence of its blade, the other scraper m' is positioned directly within the path of, and in a similar position relative to, the opposite mixer blade d and both scrapers are thus restored to their former positions preparatory to a repetition of this operation. By this means the mixing blades are kept comparatively free from dough, and the mass of such dough is thus more thoroughly disintegrated or broken up and aerated without the necessity for the operator cleaning the blade.

Ordinarily tilting means are provided for the trough a but I have not shown such in the drawings as such mechanism forms no part of my invention.

It is not my intention to limit my invention to the precise details of construction shown in the accompanying drawings, it being apparent that such may be varied without departing from the spirit and scope of the invention.

Having described the invention, what I claim as new, and desire to have protected by Letters Patent, is:—

1. In a dough mixing machine, the combination with a tilting mixing trough, a rotary mixing blade mounted upon a transverse shaft therein, and a driving gear attached to said shaft, of a frame pivotally mounted adjacent to the rear edge of the open top of said trough, a sifter or sieve carried by said frame and projecting into said trough to a point above said mixing blade, a transverse rotary shaft mounted in said frame, a gear carried by said shaft and adapted to mesh with the driving gear of said mixing blade, whereby said frame may be raised in its entirety from above said trough to permit access thereto, and said driving gear upon said last named shaft will be automatically thrown into and out of gear with said main driving gear, and a frame carried by said shaft and said sifter frame, said frame carrying a plurality of flexible agitators.

2. In a dough mixer, the combination with a trough, and a rotary mixing blade therein, of a laterally reciprocatory scraper adapted to engage, move along and scrape the dough from, the edge of said blade.

3. In a dough mixer, the combination with a trough and a rotary helicoidal blade therein, of a scraper mounted in said trough and projecting into the path of said mixer blade, whereby said blade will move said scraper laterally along its edge and scrape the dough from said edge, and means restoring said scraper to its normal position after disengagement with said blade.

4. In a dough mixer, the combination with a trough and a rotary helicoidal mixer blade therein, of a shaft in said trough, above said mixer blade, said shaft being held against rotation and having mounted thereon a non-rotary scraper mounted in said trough and projecting into the path of said mixer blade, whereby said blade will move said scraper laterally along its edge and scrape the dough from said edge, and means restoring said scraper to its normal position after disengagement with said blade.

5. In a dough mixer, the combination with a trough and a plurality of rotary helicoidal mixer blades therein, pitched toward each other, of a plurality of scrapers mounted in said trough, one of said scrapers projecting into the path of one of said mixer blades whereby each said blade will move said scraper laterally along its edge and scrape the dough from said edge, and a connection between said scrapers whereby the operative movement of one of them will force the other into position to be engaged by its blade.

6. In a dough mixer, the combination with a trough and a plurality of rotary helicoidal mixer blades therein, pitched toward each other, of a plurality of scrapers mounted in said trough, one of said scrapers projecting into the path of one of said mixer blades whereby each said blade will move said scraper laterally along its edge and scrape the dough from said edge, and a shock absorbing connection between said scrapers whereby the operative movement of one of them will force the other into position to be engaged by its blade.

7. In a dough mixer, the combination with a trough and a plurality of rotary helicoidal mixer blades therein, said blades being pitched toward each other, of a non-rotary shaft mounted in said trough above said blades, a plurality of non-rotary scrapers slidably mounted upon said shaft, one of said scrapers projecting into the path of one of said mixer blades whereby said blade will move said scraper laterally along its edge and scrape the dough from said edge, and a spring upon said shaft spacing said scrapers apart whereby the movement of one of said scrapers will, through said spring, force the other scraper into the path of its mixer blade.

In witness whereof, I have hereunto affixed my signature, this 19th day of February, 1910, in the presence of two witnesses.

CHARLES STIRIZ.

Witnesses:
P. V. WENING,
P. FRANK SONNEK.